United States Patent [19]

Takano et al.

[11] Patent Number: 4,480,505
[45] Date of Patent: Nov. 6, 1984

[54] AUTOMATIC TRANSMISSION FOR FOUR WHEEL DRIVE AUTOMOTIVE VEHICLES

[75] Inventors: Toshio Takano, Hamuramachi; Toshio Kobayashi, Koganei, both of Japan

[73] Assignee: Fuji Jukogyo Kabushiki Kaisha, Tokyo, Japan

[21] Appl. No.: 171,770

[22] Filed: Jul. 24, 1980

[30] Foreign Application Priority Data

Sep. 13, 1979 [JP] Japan .................. 54-117728

[51] Int. Cl.³ .................. B60K 41/18; B60K 41/16; F16H 37/06
[52] U.S. Cl. .................. 74/869; 74/866; 74/867; 74/868; 74/665 GA; 74/705; 74/733
[58] Field of Search .......... 192/103 R, 0.032, 0.033, 192/3.59, 3.57; 74/867, 752 A, 752 C, 15.66, 15.69, 15.82, 15.88, 15.86, 866, 868, 869, 878, 695, 720.5, 665 F, 665 G, 665 GA, 674, 705, 733, 645, 863, 864; 180/247

[56] References Cited

U.S. PATENT DOCUMENTS

| | | | |
|---|---|---|---|
| 2,714,936 | 8/1955 | Gregory | 180/247 |
| 2,749,772 | 6/1956 | O'Malley | 180/247 |
| 3,433,319 | 3/1969 | McLean | 180/247 |
| 3,627,072 | 12/1971 | Smirl | 192/357 |
| 3,868,869 | 3/1975 | Hunt et al. | 74/752 A |
| 3,895,542 | 7/1975 | Miyauchi | 74/867 |
| 3,963,085 | 6/1976 | Vinton | 180/247 |
| 3,988,951 | 11/1976 | Mair et al. | 74/869 |
| 4,138,906 | 2/1979 | Nakao et al. | 74/674 |
| 4,236,595 | 12/1980 | Beck et al. | 180/247 |
| 4,275,608 | 6/1981 | Brancolini | 74/665 BA |

Primary Examiner—Allan D. Herrmann
Assistant Examiner—D. Wright
Attorney, Agent, or Firm—Martin A. Farber

[57] ABSTRACT

An automatic transmission for a four wheel drive automotive vehicle comprising a torque converter, an automatic transmission connected to a turbine shaft of the torque converter for transmitting the output of the engine to the front-wheel, a fluid operated clutch for transmitting the output to the rear-wheel, and a pressure oil control for operating the automatic transmission. The pressure oil control includes a pressure regulator valve to produce a line pressure according to the operational condition of the engine and a valve for the clutch. The valve means is adapted to operate the clutch by manual operation, such that the automatic transmission is changed to the four wheel drive.

5 Claims, 4 Drawing Figures

AUTOMATIC TRANSMISSION FOR FOUR WHEEL DRIVE AUTOMOTIVE VEHICLES

BACKGROUND OF THE INVENTION

The present invention relates to an automatic transmission for an automotive vehicle for driving front and rear wheels, and more particularly to an automatic transmission of the trans-axle type which is adapted to drive either two-wheels or four-wheels. In recent years, the front wheel drive automobile in which the engine is mounted in a front position of the vehicle has been widely used, because of light weight and safe steering operation. Further, there has been provided a front wheel drive automobile with an automatic transmission, in which the automatic transmission is integrally assembled with the final reduction gear for the front wheel drive.

By the way, it occasionally is difficult to drive the two-wheel drive vehicle at a low speed under a heavy load in such driving conditions as a rapid starting, rough road driving or steep slope climbing. To eliminate such a defect an automobile having an automatic transmission and a clutch to drive either the front two-wheels or both of the front and rear four-wheels has been provided. Since the clutch means is a dog clutch, operation for coupling the clutch must be performed in a stopped state of the vehicle or in a straightforward driving state where no rotational difference between the front and rear wheels exists. In an automatic transmission for the rear-wheel drive, a shift lever for the clutch means must be operated after the select lever of the transmission has been shifted to the neutral position (N) or the parking position (P) for cutting off the power. Accordingly, manipulation of the levers is complicated, which means a decrease in the utility of the automatic transmission. Therefore, it is desirable that the front wheel drive is changed to the four-wheel drive in accordance with the driving condition. Further, the four-wheel drive is desirable during reverse, on an incline and on a rough road.

SUMMARY OF THE INVENTION

The present invention has an object to provide an automatic transmission having a pressure-oil-operated multiple-disk clutch for the rear-wheel drive, whereby the change between the front-wheel drive and the four-wheel drive can be performed according to various driving conditions of the automotive vehicle and further the multiple-disk clutch may be operated by the pressure oil used in the automatic transmission in accordance with the driving condition of the vehicle.

With the above and other objects and advantages in view, the present invention will become more clearly understood in connection with the detailed description of preferred embodiments, when considered with the accompanying drawings, of which:

DESCRIPTION OF THE PREFERRED EMBODIMENTS

Figure 1A:
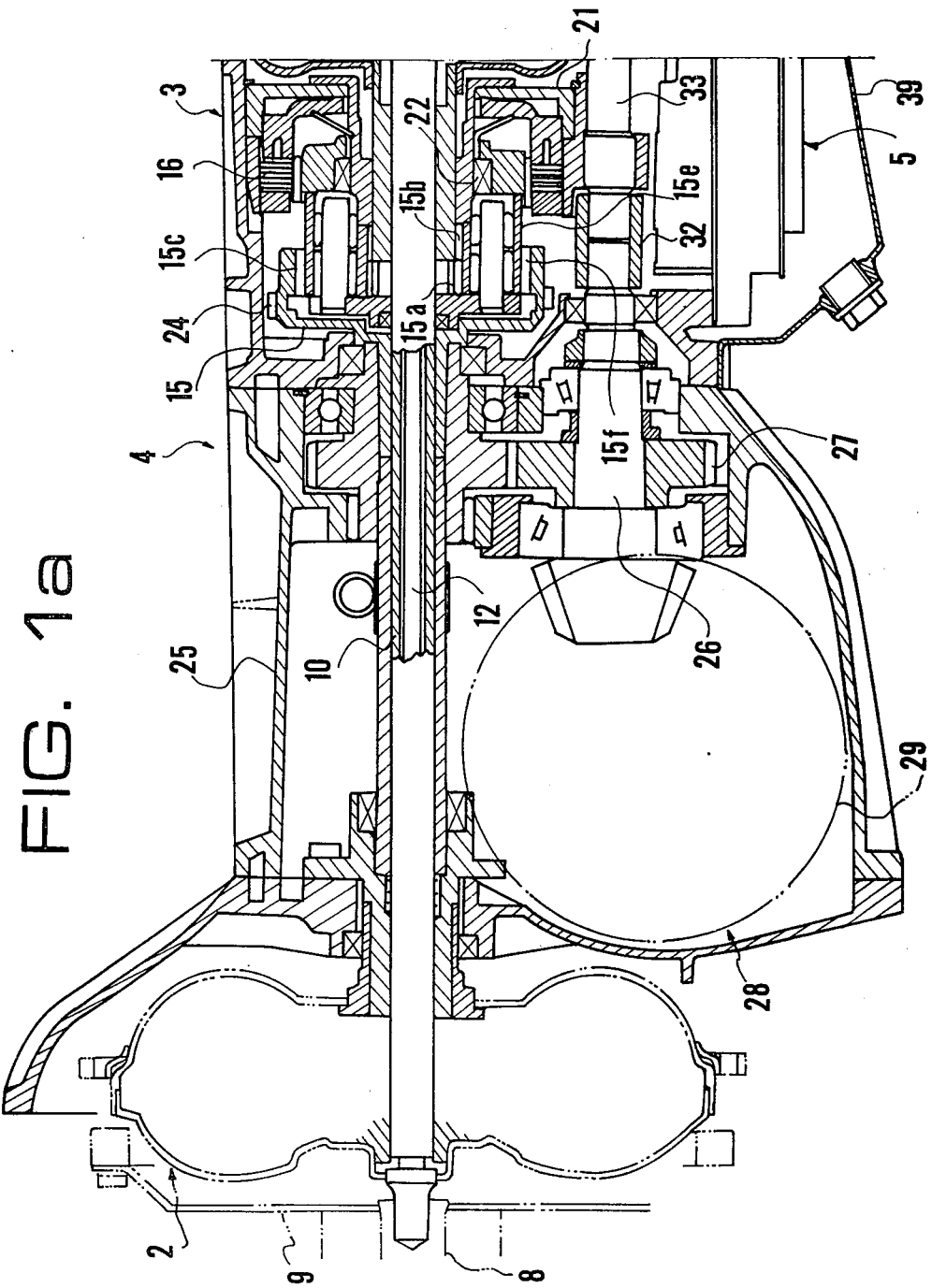
FIGS. 1a and 1b which are broken-away overlapping continuation views together constitute a sectional view of a four-wheel driving automatic transmission according to the present invention.
Figure 1B:
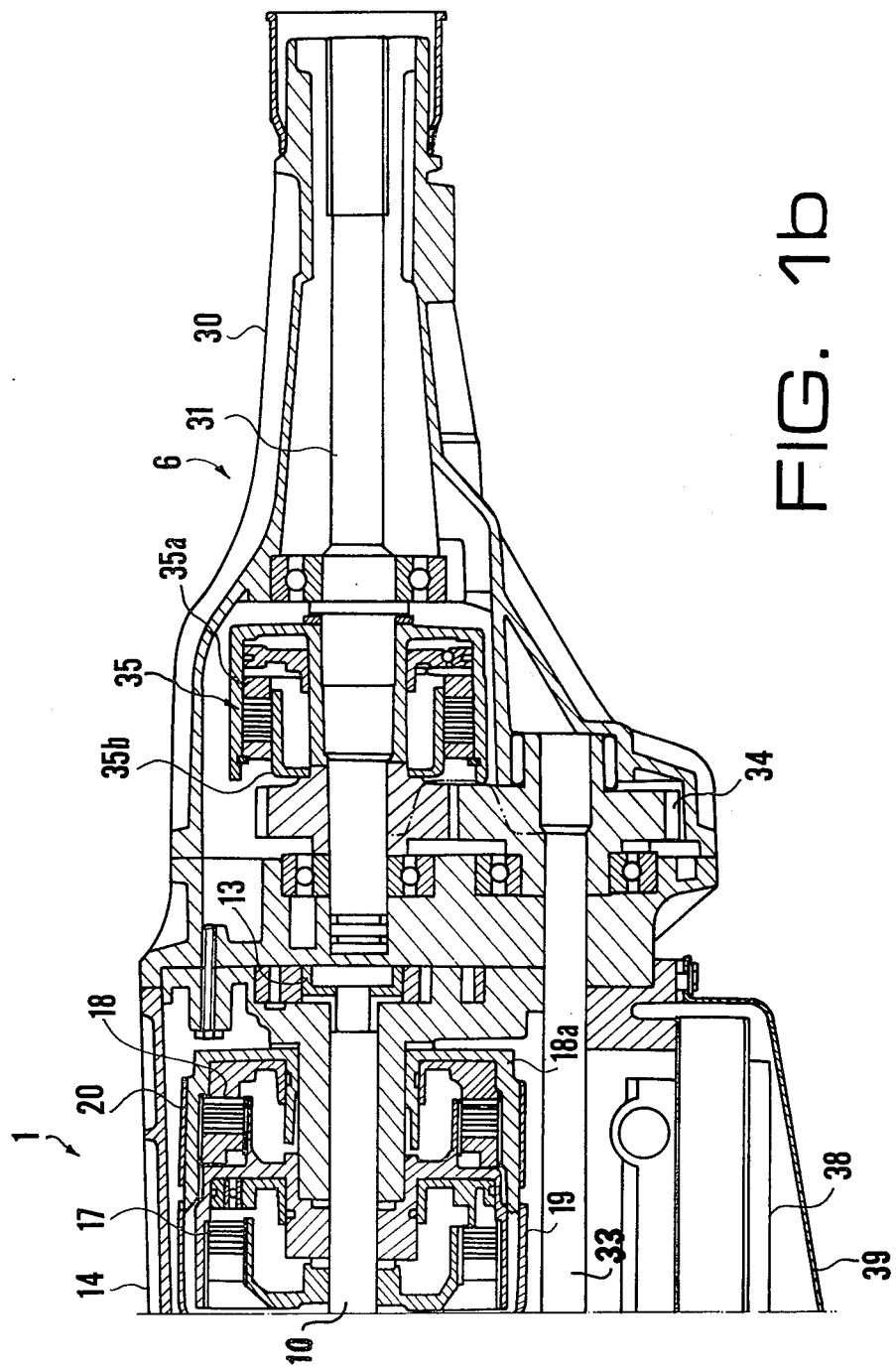
Figure 2:
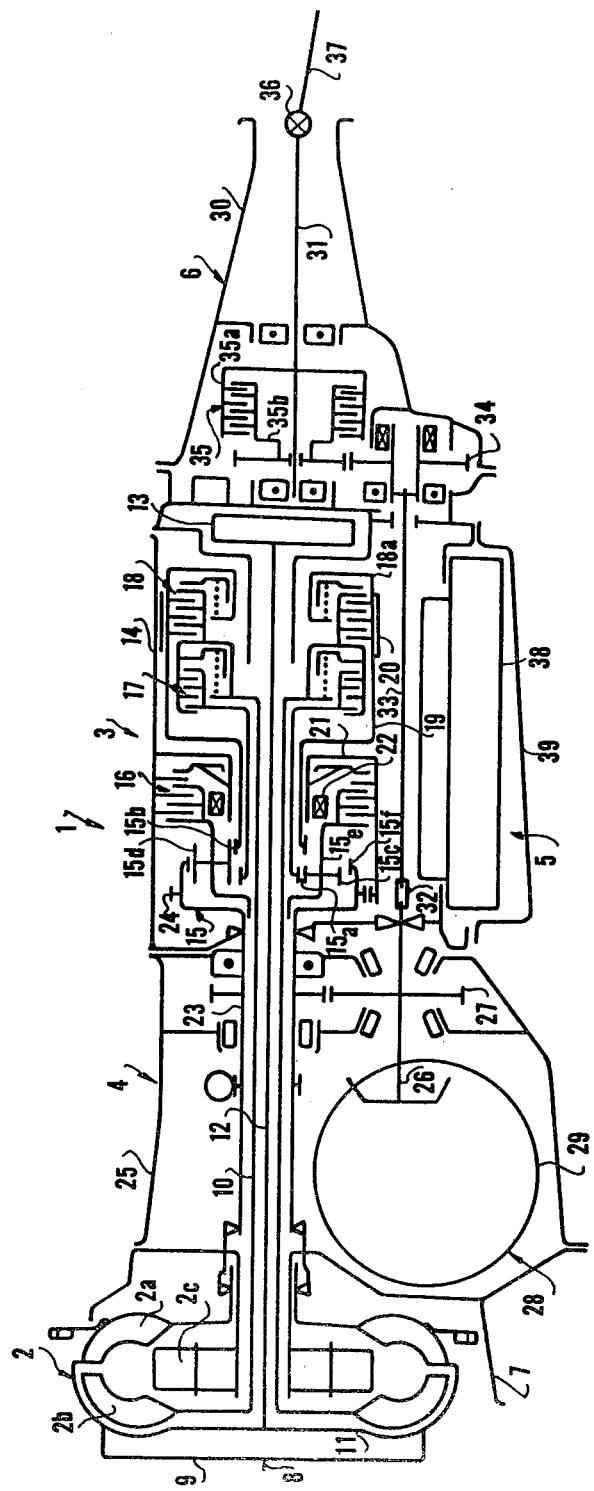
FIG. 2 is a schematic illustration of the transmission of FIGS. 1a, 1b.

Referring to FIGS. 1a, 1b and 2, numeral 1 generally designates an automatic transmission which comprises a torque converter 2, an automatic transmission means 3, a final reduction gear 4 and a pressure oil control means 5 for pressure oil. In accordance with the present invention, a multiple-disk clutch means 6 is attached to the rear portion of the automatic transmission means 3.

The torque converter 2 comprises an impeller 2a, a turbine 2b and a stator 2c. The impeller 2a is connected to a crank shaft 8 of an engine through a drive plate 9 and a turbine shaft 10 of the turbine 2b extends to the automatic transmission means 3. As well known, power of the engine is transferred to the turbine shaft 10 according to the load. A cover 11 secured to the drive plate 9 is connected to an oil pump-driving shaft 12 which passes through the turbine shaft 10 and is coupled to an oil pump 13 provided in a rear portion of the automatic transmission means 3. Thus, the oil pump 13 is driven by the engine.

The automatic transmission means 3 comprises a planetary gear 15 and a plurality of fluid operated means for producing various operational ranges. The fluid operated means comprises a low and reverse brake 16, a forward clutch 17 and a reverse clutch 18. The turbine shaft 10 is connected to a forward sun gear 15a of the planetary gear 15 by means of the forward clutch 17 and is further connected to a reverse sun gear 15b by means of the reverse clutch 18 and connecting shell 19. By actuating the clutches 17 and 18 with pressure oil, power of the turbine shaft 10 is transmitted to the sun gear 15a or 15b. A brake band 20 is provided on a drum 18a secured to the connecting shell 19 to block the reverse sun gear 15b.

In connection with the planetary gear 15, a short pinion 15c and a long pinion 15d are supported by a carrier 15e on which the low and reverse brake 16 is provided. Between the brake 16 and a center support 21, a one-way clutch 22 is provided. The carrier 15e may be locked by operation of the brake 16 and the one-way clutch 22. The ring gear 15f of the planetary gear 15 is connected to an output shaft 23 mounted on the turbine shaft 10. The planetary gear 15 is also provided with a parking gear 24.

The output shaft 23 is rotatably supported in a case 25 between a housing 7 of the torque converter 2 and a case 14 of the automatic transmission means 3.

The final reduction gear 4 is located between the output shaft 23 and the case 25. The final reduction gear 4 for the front wheel drive comprises a drive pinion 26 and a crown gear 29 of a differential 28. The drive pinion 26 is driven by the output shaft 23 by means of a reduction gear 27.

The clutch means 6 comprises a rear drive shaft 31 rotatably supported in a case 30 and a multiple-disk clutch 35 operated by pressure oil. The multiple-disk clutch 35 comprises a drum 35a secured to the rear drive shaft 31 and a hub 35b connected to a transfer gear 34 by a transfer driven gear. The transfer gear 34 is connected to a shaft 33 coupled to the drive pinion 26 by a joint 32. The rear drive shaft 31 is connected to a propeller shaft 37 through a universal joint 36.

Figure 3:
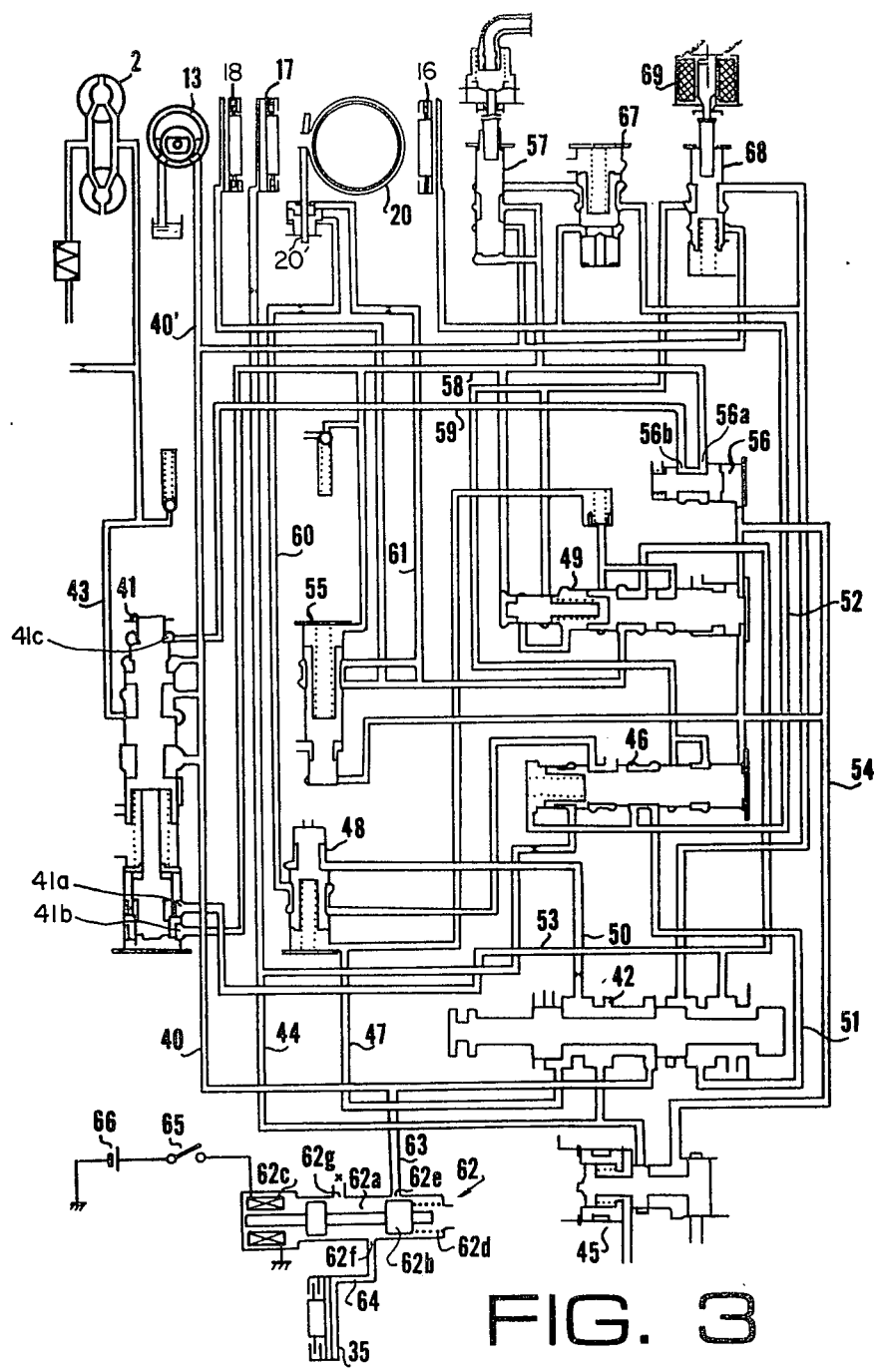
FIG. 3 is a circuit of the pressure oil control means.

The control means 5 is provided in a housing 38 secured in an oil pan 39. Referring to FIG. 3, a conduit 40' from an oil pump 13 is connected to a pressure regulator valve 41 to produce a line pressure in a pressure oil circuit. The line pressure is applied to a manual shift valve 42 through a conduit 40 and also applied to the torque converter 2 and to necessary lubricating portions through conduits 43. The manual valve 42 is adapted to change the operational range of the automatic transmission such as the N-range (neutral), P-range (parking), R-range (reverse), D-range (driving 1, 2, 3), 1-range, 2-range. For example, in the D-range, the line pressure is applied to a governor valve 45, a 1-2 shift valve 46 and the forward clutch 17 through conduits 44 and is applied to a second lock valve 48 and a 2-3 shift valve 49 through conduits 47, and further is applied to the valve 48 through a conduit 50.

In the R-range, the line pressure is applied to the 1-2 shift valve 46 through a conduit 51 to inhibit the operation thereof and further is applied to the low and reverse brake 16 through a conduit 52. The line pressure is also applied to the port 41a of the pressure regulator valve 41 and to the 2-3 shift valve 49 through conduits 53.

The governor valve 45 is adapted to produce a governor pressure according to the speed of the vehicle. The governor pressure is supplied to shift valves 46 and 49, a 2-3 timing valve 55 and a pressure modifier valve 56 through conduits 54.

Further, the line pressure in the conduit 40 is applied to a vacuum throttle valve 57 operated by a vacuum control diaphragm to produce a throttle pressure according to the load of the engine. The throttle pressure is applied to a port 56a of the pressure modifier valve 56, the 2-3 shift valve 49, the 2-3 timing valve 55 and a port 41b of the line pressure-increasing side of the pressure regulator valve 41. Another port 56b of the pressure modifier valve 56 is connected to a port 41c of the line pressure-decreasing side of the pressure regulator valve 41 by a conduit 59.

Further, 1-2 shift valve 46 is connected to an apply side of the servo 20' of the brake band 20 through the second lock valve 48 and conduit 60 to apply the line pressure. The 2-3 shift valve 49 communicates with a release side of the servo, the 2-3 timing valve 55, and the reverse clutch 18 through conduits 61 to supply the line pressure.

In the above pressure oil circuit for the automatic transmission, a solenoid operated changeover valve 62 is provided to communicate the conduit 40 with the clutch 35. The changeover valve 62 comprises a plunger 62b slidably disposed in a cylinder 62a and urged to the left by a spring 62d. A solenoid 62c is provided to shift the plunger 62b against the spring 62d. A normally closed port 62e is connected to the conduit 40 through a conduit 63. The changeover valve 62 further has a port 62f communicating with the clutch 35 through a conduit 64 and a drain port 62g. The solenoid 62c is connected to a battery 66 through a four-wheel drive switch 65 which is operable by the driver in the driver's area.

The system further comprises a throttle back up valve 67 for delaying the operation when shifted to the 2-range or 1-range, and a downshift valve 68 actuated by a solenoid 69.

In operation, the line pressure regulated by the pressure regulator valve 41 is applied to the manual valve 42 and the torque converter 2 to operate it. In the D-range, the low line pressure is supplied to the forward clutch 17 through the manual valve 42. Thus, the output power of the turbine shaft 10 is transmitted to the forward sun gear 15a. Since the carrier 15e is locked by the one-way clutch 22, the output shaft 23 rotates in the maximum reduction ratio. The rotation of the output shaft 23 is transmitted to the differential 28 by means of the reduction gear 27 and to the clutch means 6 by means of the shaft 33 and the transfer gear 34.

When the manual switch 65 is opened to de-energize the solenoid 62c, the plunger 62b of the changeover valve 62 is held in the left position (FIG. 3) by the spring 62d so that the port 62e is closed and the ports 62g and 62f communicate with each other. Thus, the clutch 35 is in the disengaged state and hence the only front wheels are driven at the first-speed. When the governor pressure increases with an increase of the speed of the vehicle, the 1-2 shift valve 46 operates to supply the line pressure in the conduit 44 to the servo 20' of the brake band 20 through the second lock valve 48 and the conduit 60 to clamp the brake 20. The reverse sun gear 15b is locked, so that the second-speed drive condition is established. When the governor pressure further increases, the 2-3 shift valve 49 is also actuated to supply the line pressure in the conduit 47 to the release side of the servo and to the reverse clutch 18 through the conduit 61. Thus, the brake 20 is released and the reverse clutch 18 is applied, so that the automatic transmission becomes integrated to couple the turbine shaft 10 with the output shaft 23. The output of the engine is directly transmitted to the output shaft 23 as the third-speed drive condition.

When the switch 65 is closed to energize the solenoid 62c, the plunger 62b of the changeover valve 62 is moved to the right against the spring 62d to close the port 62g and to communicate ports 62f and 62e with each other. Thus, the line pressure in the conduit 40 is applied to the clutch 35 to engage the drum 35a with the hub 35b, so that the rear wheels are driven by means of the rear drive shaft 31 and the propeller shaft 37. Thus, the vehicle is driven by the four-wheel drive.

In the R-range, the line pressure in the conduit 40 is applied to the low and reverse brake 16 through the valve 42, the conduit 51, the 1-2 shift valve 46 and the conduit 52, so that the low and reverse brake 16 is actuated. Further, the line pressure is applied to the reverse clutch 18 and the brake band 20 via the conduit 53, the 2-3 shift valve 49 and the conduit 61. Thus, the output of the turbine shaft 10 is transmitted to the reverse sun gear 15b by means of the reverse clutch 18 and the connecting shell 19. Since the carrier 15e is locked by the low and reverse brake 16, the output shaft 23 rotates in reverse at a large reduction ratio. If the switch 65 is closed to operate the changeover valve 62, the clutch 35 is engaged to drive the rear wheels for the four-wheel drive.

In accordance with the present invention, the transmission may be manually changed to the four-wheel drive condition in any driving condition where the front wheels may be prone to slip. Thus, accelerating ability and driveability may be improved. Since the multiple-disk clutch for driving the rear wheels are adapted to be operated by the line pressure of the automatic transmission, the construction may be simplified and it is easy to convert a front-wheel drive automatic transmission into a four-wheel drive system.

What is claimed is:

1. An automatic transmission for an automotive vehicle having front wheels and rear wheels comprising
a torque converter connected to a crank shaft of an engine of said automotive vehicle, an automatic transmission means connected to a turbine shaft of said torque converter, said automatic transmission means having a planetary gear and a plurality of fluid operated means for producing various operational ranges, said automatic transmission means includes means comprising an oil pump operatively driven by the crank shaft of said engine for producing pressure, a final reduction gear means for transmitting an output of said automatic transmission means to the front wheels of said automotive vehicle, a fluid operated multiple-disk clutch means when actuated for operatively transmitting the output of said automatic transmission means to the rear wheels, pressure oil control means for operating said fluid operated means in said automatic transmission means, said pressure oil control means including: a pressure regulator valve means connected to said oil pump of said automatic transmission means downstream of the oil pump for regulating the pressure produced by said oil pump according to operational conditions of said engine so as to provide a regulated transmission line pressure for operation of said fluid operated means of said automatic transmission means; and an output conduit of said pressure regulator valve means having said transmission line pressure;

a changeover valve means when actuated for directly connecting said conduit for the transmission line pressure to said fluid operated multiple-disk clutch means, a manual operating means for being manually operated for actuating said changeover valve means to apply the transmission line pressure to said fluid operated multiple-disk clutch means so as to actuate the latter, said fluid operated multiple-disk clutch means for its actuation being connected exclusively to said conduit and the transmission line pressure through said manual operating means, said changeover valve means having a solenoid, and said manual operating means comprising a manually operatable switch means, provided in a driver's area of the automotive vehicle, operatively connected to said solenoid, said switch means for operating the solenoid.

2. The automatic transmission for an automotive vehicle according to claim 2, wherein said oil pump is connected directly to said pressure regulator valve means, said conduit and said changeover valve means.

3. The automatic transmission for an automotive vehicle according to claim 1, wherein said conduit is connected directly to said pressure regulator valve means and to said oil pump.

4. The automatic transmission for an automotive vehicle according to claim 2, wherein said oil pump is driven directly by said crank shaft.

5. The automatic transmission for an automotive vehicle according to claim 2, wherein said control means for said automatic transmission means includes a manual shift valve having an input connected to said conduit downstream of a branch-off of said conduit to said changeover valve means.

* * * * *